April 21, 1959     W. B. THOMPSON     2,882,867
CLOSED CENTER VALVE WITH ZERO LEAK FEATURE
Filed June 18, 1956
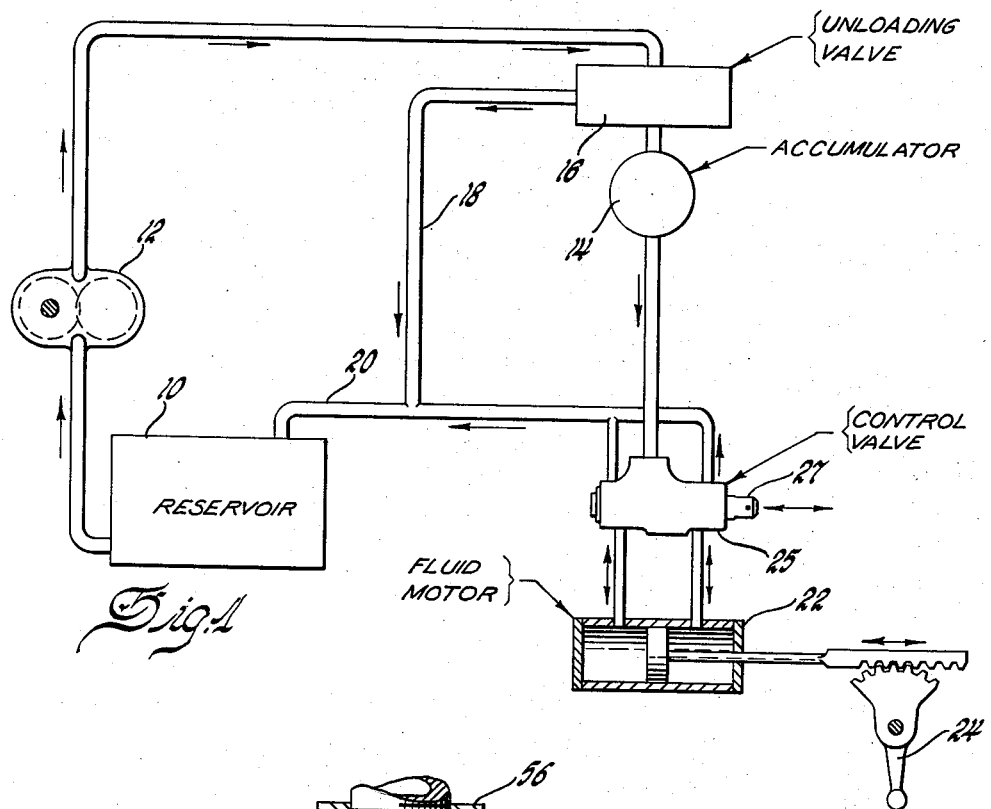
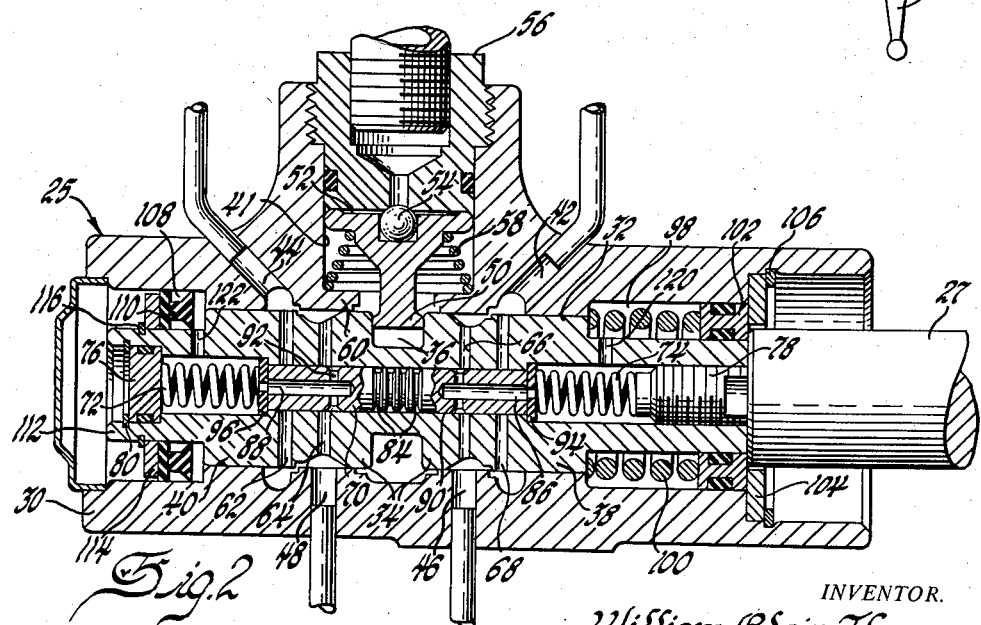
INVENTOR.
William Blair Thompson
BY
ATTORNEY United States Patent Office 2,882,867
Patented Apr. 21, 1959

2,882,867

CLOSED CENTER VALVE WITH ZERO LEAK FEATURE

William B. Thompson, Saginaw, Mich., assignor to General Motors Corporation, Detroit, Mich., a corporation of Delaware Application June 18, 1956, Serial No. 592,093

3 Claims. (Cl. 121—46.5)

This invention relates to a servo valve and more particularly to a valve of this category which is especially adapted for use in a fluid pressure system including an accumulator.

The invention in its most specific aspect concerns such a valve as applied in an automotive vehicle as a component of a central hydraulic system additionally comprising, with an accumulator, various accessories served by the accumulator, e.g., power steering apparatus, hydraulic starter, brake boosters, windshield wipers, seat adjusters, trunk and hood lifts, etc. In a system as thus generally described, the accumulator is maintained pressurized by a pump drawing from a reservoir to which all of the accessory motors exhaust and normally powered from the engine of the vehicle as by belt and pulley.

Leak down of the accumulator, occurring say incident to overnight idleness of the vehicle, is invariably inconvenient if not hazardous and it is a principal object of this invention to provide means preventing such leak down.

Another and more particular object is to accomplish the foregoing through means associated with the servo valve.

Still other objects and features of the invention will be apparent from the following description of a preferred embodiment thereof. The description will proceed with reference to the accompanying drawings in which—

Figure 1 diagrammatically illustrates a system of the type to which the invention is particularly applicable; and Figure 2 is a longitudinal section through the servo valve.

Referring first to Figure 1, the numeral 10 denotes a reservoir from which a pump 12 draws to maintain an accumulator 14 at a predetermined pressure. Assuming an automotive installation, the pump 12, as previously indicated, would normally be belted to the crankshaft of the vehicle engine. An unloader valve 16 serves as the accumulator pressure control. Thus, when the accumulator is up to pressure the pump discharge is bypassed to the reservoir 10 via lines 18 and 20. If desired, the unloader valve may be built into the pump—see United States Patent No. 2,848,009 granted August 19, 1958, to Paul V. Wysong and Robert P. Rohde.

The accumulator pressure is shown as applied to a motor 22 operably connected to a pivoted arm 24 which may be taken as a pitman arm, for example, suitably connected to the steering linkage of the vehicle. Motor 22 is under the control of a servo valve 25 actuated through a link 27 which, if arm 24 is taken as a steering arm, should be considered as operably connected to another steering member, as the steering shaft.

It will, of course, be appreciated that such a system may comprise substantially any number of motors within the capacity of the accumulator, and that only one is shown in the interest of simplifying the disclosure.

The servo valve 25 is shown in detail by Figure 2, wherein the numeral 30 denotes the housing component thereof. Accommodated in a central bore in the housing is a spool 32 into which the link 27 is threaded. Spool 32 comprises a pair of of central lands 34, spaced by an annular channel 36 and end lands 38 and 40. The central lands 34 are functional with respect to an inlet port 41 in the housing 30, while lands 38 and 40 are functional with relation to exhaust ports 42 and 44, respectively.

Ports 46 and 48 represent the outlets to the lines (Fig. 1) leading to the fluid motor 22; hence may be referred to as "power" ports.

According to the invention, the annular channel 36 between the central lands 34 receives the end of the stem or shank portion 50 of a poppet valve, operating to prevent loss of accumulator pressure by leakage through the servo valve when the central land is in its shown position, i.e. when such land is in its closed position. The head portion 52 of the poppet valve has a recess therein for the accommodation of a ball 54 for which an apertured plug 56 fixed in the housing 30 provides a seat. Ball 54 is held in its position shown by force of a conical coil spring 58 seated on an annular shoulder 60 within the inlet port.

Spool 32 will be seen as having four radial bores 62, 64, 66, and 68 the purpose of which will later appear. Additionally, the spool has a central bore accommodating a double acting relief valve comprising a plug member 70 and springs 72 and 74 backed, respectively, by a seal ring 76 and the threaded extension 78 of the link 27. A snap ring 80, received in an annular recess at the end of the spool 32, secures the seal ring 76.

The plug component 70 of the double acting relief valve has a plurality of annular grooves 84 operating to entrap any fine particles of dirt or other foreign matter which might be carried by the hydraulic fluid. In addition, the plug 70 is axially and radially bored to provide passageways 86, 88, 90, and 92, the purpose of which will be later described. Spring seats 94 and 96 are centrally apertured, the apertures representing continuations of the axial passageways 86 and 88.

At the right-hand end of the spool 32 is a chamber 98 confining a spring 100 which tends to maintain the spool in its centered position illustrated. The spring 100 seats at its inner end against a shoulder formed incident to the reduction in the diameter of the spool at its right-hand end and a shoulder formed incident to the counter boring of the housing component of the valve providing the space for the spring. At its outer end the spring 100 bears against a seal ring 102 shouldering against the link 27 and a washer 104 secured by a lock ring 106.

Spool 32 and housing 30 at the left-hand end of the valve are respectively reduced and recessed to provide a chamber 108 in which is located a block V seal 110 seating on a support 112, such support being backed by a ring piece 114 secured by a snap ring 116.

The purpose of chambers 98 and 108, which are adapted to receive fluid from the inlet port, is to provide for the setting up of a resistance to movement of spool 32 in either axial direction which resistance is proportionate to the load as represented by arm 24 in Figure 1. Such load is obviously reflected by the pressure required in the fluid motor to rotate the arm on its pivot. The modus operandi of this "feel" system and the relationship of the double acting relief valve thereto is described below.

Operation

Assuming the link 27 is moved leftward, the poppet valve including the shank portion 50 is rocked clockwise so that pressure fluid from the inlet port is charged to the right end of the motor 22 via power port 46. At the same time, fluid from the inlet enters the chamber 98 via the passageway 66 in the spool 32, the radial passageway 90 in the plunger portion of the double acting relief valve, the axial passageway 86 in such plunger and a short passageway 120 at the right-hand reduced portion of the spool 32. The pressure fluid so admitted to the chamber 98 acts against the ring seal 104 which, as previously stated, is shouldered against the link 27.

With the spool 32 displaced to the left, the left end of the motor 22 will be seen as open to exhaust, i.e. line 20 (Fig. 1), via the power port 48 and port 44. Feel chamber 108 at the left of the valve spool 32 is also open to exhaust, the flow of fluid from such chamber following a course defined by the short passageway 122 in the spool, the axial bore 88 in the relief valve plunger, the radial bore 92 therein, the radial bore 64 in the spool 32, and passageway 44 which, as just stated, connects with line 20 (Fig. 1).

Now with the spool 32 moving leftward, should the resistance at 24 (Fig. 1) become so excessive as to give rise to a pressure in chamber 98 requiring the imposition of an undue amount of effort to the link 27, the relief valve plunger will be displaced leftward to block the flow of pressure fluid to the chamber 98 from the radial passage 66 in the spool 32. Assuming sufficient pressure in the chamber 98, the relief valve plunger may be shifted to the left to an extent such that fluid in the chamber 98 is allowed egress to exhaust via the radial passageway 68 in the spool 32.

It will be understood that the pressure at which the relief valve yields when the spool 32 is displaced to the left is a function of the spring 72. Conversely on rightward displacement of the spool, the pressure at which the relief valve yields is a function of spring 74.

The operation of the valve on rightward movement of the spool 32 accords with the above description except, of course, for the reversal of the fluid flow. Thus, on the rightward displacement the poppet valve controlling ball 54 is rocked counterclockwise to allow for flow of pressure fluid to the motor via passage 48 and to open the right end of the motor to exhaust via the passageways 46 and 42. In this case, the pressure fluid in the feel chamber 108 acts against the V block seal, which is backed by the lock ring outward of the seal seat 112.

The invention being thus described and illustrated what is claimed is:

1. In a servo valve comprising a pair of telescopically disposed relatively axially movable members, the outer of said members having an inlet, port, a pair of power ports and a pair of outlet ports therein, the inner of said members having lands functional with respect to said ports, said members being formed to provide a pair of chambers, one at either end of said inner member, adapted for the reception of pressure fluid derived from said inlet port and serving to resist relative axial movement of said members, a double acting relief valve disposed in a bore in said inner member, said relief valve being functional with respect to said chambers and exhausting to said outlet ports, and an auxiliary valve positioned in operable relation to said inlet port to prevent flow therethrough when said members are in their normal neutral positions, said auxiliary valve being operably connected to the inner of said members for displacement on relative movement of said members whereby fluid is charged to one of said power ports and to one of said chambers, said operable connection being effected through means accommodated between an adjacent pair of said lands.

2. In a servo valve comprising a pair of telescopically disposed relatively axially movable members, the outer of said members having an inlet port, a pair of power ports and a pair of outlet ports therein, the inner of said members including a pair of lands functional with respect to said inlet port, said members being formed to provide a pair of chambers, one at either end of said inner member, adapted for the reception of pressure fluid derived from said inlet port and serving to resist relative axial movement of said members, a double acting relief valve disposed in a bore in said inner member, said relief valve being functional with respect to said chambers and exhausting to said outlet ports, and an auxiliary valve operating to prevent leakage through the servo valve when the said lands are in closed position, said auxiliary valve including a ball element normally disposed on a seat provided in said inlet port and a rockable component in said inlet port supporting said ball element and having a portion accommodated between said lands in engagement with the opposed walls thereof, whereby said component is rocked with displacement of said ball element to permit flow through said inlet port to one of said power ports and to one of said chambers on the relative movement of said members.

3. In a servo valve comprising a pair of telescopically disposed relatively axially movable members, the outer of said members having an inlet port, a pair of power ports and a pair of outlet ports therein, the inner of said members including a pair of lands functional with respect to said inlet port, said members being formed to provide a pair of chambers, one at either end of said inner member, adapted for the reception of pressure fluid derived from said inlet port and serving to resist relative axial movement of said members, a double acting relief valve disposed in a bore in said inner member, said relief valve being functional with respect to said chambers and exhausting to said outlet ports, and an auxiliary valve operating to prevent leakage through the servo valve when the said lands are in closed position, said auxiliary valve including a ball element, a plug accommodated in said inlet port to provide a seat for said ball element and a rockable component serving to maintain said ball element on said seat when said lands are in said position, said component being loaded by a conical coil spring accommodated on a shoulder formed in said inlet port and having a shank portion disposed between said lands in engagement with the opposed walls thereof, whereby on relative movement of said members said component is rocked with displacement of said ball element to permit flow through said inlet port to one of said power ports and to one of said chambers.

References Cited in the file of this patent

UNITED STATES PATENTS

| 871,157 | Andrews | Nov. 19, 1907 |
| 1,158,204 | Grandstaff | Oct. 26, 1915 |
| 1,835,686 | Allen | Dec. 8, 1931 |
| 2,388,010 | Pohl | Oct. 30, 1945 |

FOREIGN PATENTS

| 695 | Great Britain | Jan. 10, 1914 |
| 24,126 | Great Britain | Nov. 8, 1904 |